United States Patent
Lu et al.

(10) Patent No.: US 11,713,367 B2
(45) Date of Patent: Aug. 1, 2023

(54) INHIBITION OF CRYSTALLIZATION IN POLYURETHANE RESINS

(71) Applicant: CARBON, INC., Redwood City, CA (US)

(72) Inventors: Jie Lu, Fremont, CA (US); Kai Chen, Sunnyvale, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/757,255

(22) PCT Filed: Dec. 15, 2020

(86) PCT No.: PCT/US2020/065005
§ 371 (c)(1),
(2) Date: Jun. 13, 2022

(87) PCT Pub. No.: WO2021/133585
PCT Pub. Date: Jul. 1, 2021

(65) Prior Publication Data
US 2023/0007999 A1 Jan. 12, 2023

Related U.S. Application Data

(60) Provisional application No. 62/952,771, filed on Dec. 23, 2019.

(51) Int. Cl.
*C08F 290/06* (2006.01)
*B33Y 10/00* (2015.01)
(Continued)

(52) U.S. Cl.
CPC ........ *C08F 290/067* (2013.01); *B29C 64/124* (2017.08); *B29C 64/35* (2017.08);
(Continued)

(58) Field of Classification Search
CPC ......... B33Y 10/00; B33Y 40/20; B33Y 70/00; B29C 64/124; B29C 64/35; C08F 290/067; C08G 18/10
See application file for complete search history.

(56) References Cited

U.S. PATENT DOCUMENTS 3,213,058 A  10/1965  Boyle et al.
3,694,389 A   9/1972  Levy
(Continued)

FOREIGN PATENT DOCUMENTS

EP  0525578 A1  2/1993

OTHER PUBLICATIONS

International Search Report and Written Opinion corresponding to PCT/US2020/065005; dated Mar. 3, 2021 (12 pages).
(Continued)

*Primary Examiner* — Nahida Sultana
(74) *Attorney, Agent, or Firm* — Myers Bigel, P.A.

(57) ABSTRACT

A resin composition useful for additive manufacturing is provided, which resin composition may exhibit improved shelf life through inhibition of crystallization. Such resin composition may include a crystallization inhibitor as taught herein, and/or a prepolymer produced by reaction of an isocyanate with multiple isomers and comprising a lower percentage of the structurally symmetric isomer. Methods of forming a three-dimensional object using such resin composition are also provided.

27 Claims, 2 Drawing Sheets

(51) Int. Cl.
*B33Y 70/00* (2020.01)
*B29C 64/124* (2017.01)
*B29C 64/35* (2017.01)
*B33Y 40/20* (2020.01)
*C08G 18/10* (2006.01)
*C08G 18/32* (2006.01)
*C08G 18/67* (2006.01)
*C08G 18/73* (2006.01)
*C08G 18/75* (2006.01)
*C08G 18/76* (2006.01)
*C08G 18/81* (2006.01)
*C08K 5/098* (2006.01)
*C08K 5/17* (2006.01)
*C08K 5/21* (2006.01)
*B29K 75/00* (2006.01)
*B29K 105/00* (2006.01)

(52) U.S. Cl.
CPC .............. *B33Y 10/00* (2014.12); *B33Y 40/20* (2020.01); *B33Y 70/00* (2014.12); *C08G 18/10* (2013.01); *C08G 18/3203* (2013.01); *C08G 18/3225* (2013.01); *C08G 18/672* (2013.01); *C08G 18/73* (2013.01); *C08G 18/755* (2013.01); *C08G 18/757* (2013.01); *C08G 18/7614* (2013.01); *C08G 18/7621* (2013.01); *C08G 18/7642* (2013.01); *C08G 18/7671* (2013.01); *C08G 18/7678* (2013.01); *C08G 18/7685* (2013.01); *C08G 18/8175* (2013.01); *C08K 5/098* (2013.01); *C08K 5/17* (2013.01); *C08K 5/21* (2013.01); *B29K 2075/00* (2013.01); *B29K 2105/0005* (2013.01)

(56) References Cited

U.S. PATENT DOCUMENTS

| | | | |
|---|---|---|---|
| 5,236,637 A | 8/1993 | Hull | |
| 5,391,072 A | 2/1995 | Lawton et al. | |
| 5,529,473 A | 6/1996 | Lawton et al. | |
| 5,734,002 A | 3/1998 | Reich et al. | |
| 6,433,121 B1 | 8/2002 | Petrovic et al. | |
| 6,861,475 B2 | 3/2005 | Ilenda et al. | |
| 6,916,867 B2 | 7/2005 | Gugumus | |
| 7,157,586 B2 | 1/2007 | Wood et al. | |
| 7,279,505 B2 | 10/2007 | Phelan et al. | |
| 7,438,846 B2 | 10/2008 | John | |
| 7,625,977 B2 | 12/2009 | Lutz et al. | |
| 7,642,316 B2 | 1/2010 | Rego et al. | |
| 7,695,643 B2 | 4/2010 | Fritzsche et al. | |
| 7,892,474 B2 | 2/2011 | Shkolnik et al. | |
| 8,088,245 B2 | 1/2012 | Lutz et al. | |
| 8,110,135 B2 | 2/2012 | El-Siblani | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 10,240,066 B2 | 3/2019 | Rolland et al. | |
| 2009/0233102 A1* | 9/2009 | Toyama | C09J 175/04 524/401 |
| 2013/0202392 A1 | 8/2013 | Morimoto et al. | |
| 2013/0292862 A1 | 11/2013 | Joyce | |
| 2013/0295212 A1 | 11/2013 | Chen et al. | |
| 2015/0184039 A1 | 7/2015 | Lutz et al. | |
| 2015/0240113 A1 | 8/2015 | Pratt et al. | |
| 2015/0331402 A1 | 11/2015 | Lin et al. | |
| 2015/0360419 A1 | 12/2015 | Willis et al. | |
| 2016/0122539 A1* | 5/2016 | Okamoto | C09J 11/08 521/137 |
| 2016/0288376 A1 | 10/2016 | Sun et al. | |
| 2017/0129167 A1 | 5/2017 | Castanon | |
| 2017/0129169 A1 | 5/2017 | Batchelder et al. | |
| 2018/0126630 A1 | 5/2018 | Panzer et al. | |
| 2018/0185715 A1* | 7/2018 | Demkowski | A63B 60/52 |
| 2018/0243976 A1 | 8/2018 | Feller | |
| 2018/0290374 A1 | 10/2018 | Willis et al. | |
| 2018/0345576 A1* | 12/2018 | Constantinou | B29C 64/171 |
| 2019/0023917 A1 | 1/2019 | Drazba et al. | |
| 2019/0309163 A1* | 10/2019 | Hodgdon | B33Y 70/10 |
| 2019/0388861 A1* | 12/2019 | Walters | A61K 8/11 |
| 2021/0147650 A1* | 5/2021 | Levy | C08J 9/0061 |

OTHER PUBLICATIONS

Janusziewicz, Rima, et al., "Layerless fabrication with continuous liquid interface production", PNAS, 113(42), 2016, 11703-11708.
Tumbleston, John R., et al., "Continuous liquid interface production of 3D Objects", Science, 347(6228), 2015, 1349-1352.

* cited by examiner

INHIBITION OF CRYSTALLIZATION IN POLYURETHANE RESINS

CROSS REFERENCE TO RELATED APPLICATIONS

This application is a 35 U.S.C. § 371 national phase application of International Application Serial No. PCT/US2020/065005, filed Dec. 15, 2020, which claims the benefit of U.S. Provisional Application No. 62/952,771, filed Dec. 23, 2019, the disclosures of which are incorporated by reference herein.

BACKGROUND

Polyurethane oligomers terminated with UV-curable groups including acrylate or methacrylate are useful as 3D printing resins through the polymerization of the double bond. See, e.g., U.S. Pat. Nos. 9,598,606 and 10,240,066 to Rolland et al., and European Patent Application Publication No. EP 0525578 to Peiffer. To make a UV curable polyurethane oligomer, a standard method is to react a polyurethane prepolymer having isocyanate (NCO) functional groups at the termini with hydroxyl- or amino-containing (meth)acrylate monomers.

One problem that can occur with some 3D printing resins containing UV curable polyurethane oligomers is crystal formation in the resin over time, which can be difficult to reverse to liquid form through heating due to a high melting point of the crystalized molecules.

Formulations exhibiting improved shelf life through inhibition of such crystallization would be beneficial.

SUMMARY

It has been found that by addition of a low percentage of certain additives into polyurethane oligomer resins, the crystal formation can be inhibited. Small molecules including amino alcohols, amines, ureas, salts, and polymers such as PVP were found to work efficiently to inhibit the crystal growth.

Accordingly, provided is a resin composition useful for additive manufacturing, comprising: (i) a reactive prepolymer, said prepolymer comprising polyurethane, polyurea, or a copolymer thereof, and terminated (e.g., capped or blocked) with a reactive group, said reactive group polymerizable by actinic radiation or light (e.g., in an amount of from 5, 10, or 20 percent by weight to 70, 80, or 90 percent by weight); (ii) a reactive monomer, wherein said monomer is produced by reaction of an isocyanate with a reactive capping agent or a reactive blocking agent (e.g., in an amount of 90, 80, or 70 percent by weight to 20, 10, or 5 percent by weight); (iii) a crystallization inhibitor (e.g., in an amount of from 0.05 or 0.1 to 1 or 5% by weight); (iv) optionally, a photoinitiator (e.g., in an amount of from 0.1 to 4 percent by weight); (v) optionally, a reactive or non-reactive diluent; and (vi) optionally, an ultraviolet light absorber and/or pigment (e.g., in an amount of from 0.01 or 0.1 to 1 or 2 percent by weight).

In some embodiments, the group polymerizable by actinic radiation or light is an acrylate, methacrylate, maleimide, or n-vinyl formamide.

In some embodiments, the reactive prepolymer is produced by reaction of a polyisocyanate oligomer with an amine (meth)acrylate or hydroxyl (meth)acrylate capping agent or blocking agent.

In some embodiments, the crystallization inhibitor comprises a small molecule amine, amino alcohol, urea, or salt. In some embodiments, the crystallization inhibitor comprises a polymer such as polyvinylpyrrolidone (PVP), polyvinylpyrrolidone-vinyl acetate copolymer (PVPVA), hydroxypropyl methylcellulose (HPMC), hypromellose acetate succinate (HPMCAS), polyacrylic acid (PAA), or a mixture of two or more thereof.

In some embodiments, the reactive monomer is produced by reaction of an isocyanate selected from the group consisting of: methylene diphenyl diisocyanate (MDI), toluene diisocyanate (TDI), para-phenylene diisocyanate (PPDI), O-tolidine diisocyanate (TODI), 1,5-naphthalene diisocyanate (NDI), hydrogenated MDI (HMDI), isophorone isocyanate (IPDI), hexamethylene diisocyanate (HDI), xylene diisocyanate (XDI), and hydrogenated xylene diisocyanate (H6XDI). In some embodiments, the reactive monomer is produced by reaction of an isocyanate selected from the group consisting of: MDI, PPDI, NDI, HMDI, HDI, and H6XDI.

Also provided is a method of forming a three-dimensional object comprising polyurethane, polyurea, or a copolymer thereof, comprising: (a) providing a resin composition as taught herein; and (b) forming the three-dimensional object by an additive manufacturing process including irradiating said resin composition with light to polymerize the reactive prepolymer and form said three-dimensional object comprising polyurethane, polyurea, or a copolymer thereof.

In some embodiments, the forming step (b) is carried out by stereolithography (e.g., bottom-up stereolithography such as continuous liquid interface production).

In some embodiments, the forming step (b) is carried out by: (i) providing a carrier and an optically transparent member having a build surface, said carrier and said build surface defining a build region therebetween; (ii) filling said build region with said resin composition, and (iii) irradiating said build region with light through said optically transparent member to polymerize said resin composition and also advancing said carrier and said build surface away from one another to form said three-dimensional object.

Further provided is a dual cure additive manufacturing resin, comprising: (a) light polymerizable component comprised of: (i) a prepolymer comprising a blocked or reactive blocked polyurethane, polyurea, or copolymer thereof (e.g., in an amount of from 5, 10, or 20 percent by weight to 70, 80, or 90 percent by weight); (ii) a reactive monomer, wherein said monomer is produced by reaction of an isocyanate with a reactive capping agent or a blocking agent (e.g., in an amount of 90, 80, or 70 percent by weight to 20, 10, or 5 percent by weight); (iii) a crystallization inhibitor (e.g., in an amount of from 0.05 or 0.1 to 1 or 5% by weight); (iv) optionally, a photoinitiator (e.g., in an amount of from 0.1 to 4 percent by weight); (v) optionally, a reactive or non-reactive diluent; and (vi) optionally, an ultraviolet light absorber and/or pigment (e.g., in an amount of from 0.01 or 0.1 to 1 or 2 percent by weight); and (b) a heat polymerizable component comprised of a chain extender selected from the group consisting of polyols, polyamines, and combinations thereof (e.g., in an amount of from 5 or 10 percent by weight to 30 or 40 percent by weight).

In some embodiments, the prepolymer comprises a (meth)acrylate blocked polyurethane/polyurea (ABPU).

In some embodiments, the reactive blocked prepolymer is produced by reaction of a polyisocyanate oligomer with an amine (meth)acrylate or a hydroxyl (meth)acrylate blocking agent.

In some embodiments, the crystallization inhibitor comprises a small molecule amine, amino alcohol, urea, or salt. In some embodiments, the crystallization inhibitor comprises a polymer such as polyvinylpyrrolidone (PVP), polyvinylpyrrolidone-vinyl acetate copolymer (PVPVA), hydroxypropyl methylcellulose (HPMC), hypromellose acetate succinate (HPMCAS), polyacrylic acid (PAA), or a mixture of two or more thereof.

In some embodiments, the reactive monomer is produced by reaction of an isocyanate selected from the group consisting of: methylene diphenyl diisocyanate (MDI), toluene diisocyanate (TDI), para-phenylene diisocyanate (PPDI), O-tolidine diisocyanate (TODI), 1,5-naphthalene diisocyanate (NDI), hydrogenated MDI (HMDI), isophorone isocyanate (IPDI), hexamethylene diisocyanate (HDI), xylene diisocyanate (XDI) hydrogenated xylene diisocyanate (H6XDI). In some embodiments, the reactive monomer is produced by reaction of an isocyanate selected from the group consisting of: MDI, PPDI, NDI, HMDI, HDI, and H6XDI.

Also provided is a method of forming a three-dimensional object comprising polyurethane, polyurea, or a copolymer thereof, comprising: (a) providing a dual cure resin composition as taught herein; (b) producing a three-dimensional intermediate from said resin composition by an additive manufacturing process including irradiating said resin composition with light to form a solid polymer scaffold from said light polymerizable component and containing said heat polymerizable component carried in said scaffold in unsolidified and/or uncured form, said intermediate having the same shape as, or a shape to be imparted to, said three-dimensional object; (c) optionally cleaning said intermediate (e.g., by washing, wiping (with a blade, absorbent, compressed gas, etc.), gravity draining, centrifugal separation of residual resin therefrom, etc., including combinations thereof); and (d) concurrently with or subsequent to said producing step (b), heating, microwave irradiating, or both, said heat polymerizable component in said three-dimensional intermediate, to form said three-dimensional object comprising polyurethane, polyurea, or a copolymer thereof.

In some embodiments, the producing step (b) is carried out by stereolithography (e.g., bottom-up stereolithography such as continuous liquid interface production).

In some embodiments, the producing step (b) is carried out by: (i) providing a carrier and an optically transparent member having a build surface, said carrier and said build surface defining a build region therebetween; (ii) filling said build region with said resin composition, and (iii) irradiating said build region with light through said optically transparent member to form said solid polymer scaffold from said first component and also advancing said carrier and said build surface away from one another to form said three-dimensional intermediate.

In some embodiments, step (d) is carried out subsequent to said producing step (b), and optionally but preferably subsequent to said cleaning step (c).

Further provided is a three-dimensional object produced by a method as taught herein.

As also taught herein, for a diisocyanate containing multiple isomers, modifying the isomer ratio to reduce the isomer having high symmetry can also inhibit the crystal growth. Accordingly, provided herein is a resin composition useful for additive manufacturing, comprising: (i) a reactive prepolymer, said prepolymer comprising polyurethane, polyurea, or copolymer thereof, and terminated (e.g., capped or blocked) with a reactive group, said reactive group curable by actinic radiation or light (e.g., in an amount of from 5, 10, or 20 percent by weight to 70, 80, or 90 percent by weight); (ii) a reactive monomer, wherein said monomer is produced by reaction of an isocyanate with a reactive capping agent or a blocking agent (e.g., in an amount of from 90, 80, or 70 percent by weight to 20, 10, or 5 percent by weight); (iii) optionally, a crystallization inhibitor (e.g., in an amount of from 0.05 or 0.1 to 1 or 5% by weight); (iv) optionally, a photoinitiator (e.g., in an amount of from 0.1 to 4 percent by weight); (v) optionally, a reactive or non-reactive diluent; and (vi) optionally, an ultraviolet light absorber and/or pigment (e.g., in an amount when present of from 0.01 or 0.1 to 1 or 2 percent by weight), wherein said reactive monomer is produced by reaction of an isocyanate (e.g., selected from the group consisting of: MDI, PPDI, NDI, HMDI, HDI, and H6XDI), wherein said isocyanate comprises multiple isomers and wherein the isocyanate comprises a lower percentage of the structurally symmetric isomer (e.g., less than 20% of the total isocyanate).

Also provided is a dual cure additive manufacturing resin, comprising: (a) light polymerizable component comprised of: (i) a prepolymer comprising a blocked or reactive blocked polyurethane, polyurea, or copolymer thereof (e.g., in an amount of from 5, 10, or 20 percent by weight to 70, 80, or 90 percent by weight); (ii) a reactive monomer, wherein said monomer is produced by reaction of an isocyanate with a reactive capping agent or a reactive blocking agent (e.g., in an amount of 90, 80, or 70 percent by weight to 20, 10, or 5 percent by weight); (iii) optionally, a crystallization inhibitor (e.g., in an amount of from 0.05 or 0.1 to 1 or 5% by weight); (iv) optionally, a photoinitiator (e.g., in an amount of from 0.1 to 4 percent by weight); (v) optionally, a reactive or non-reactive diluent; and (vi) optionally, an ultraviolet light absorber and/or pigment (e.g., in an amount of from 0.01 or 0.1 to 1 or 2 percent by weight), wherein said prepolymer is produced by reaction of an isocyanate (e.g., selected from the group consisting of: MDI, PPDI, NDI, HMDI, HDI, and H6XDI), wherein said isocyanate comprises multiple isomers and wherein the isocyanate comprises a lower percentage of the structurally symmetric isomer (e.g., less than 20% of the total isocyanate); and (b) a heat polymerizable component comprised of a chain extender selected from the group consisting of polyols, polyamines, and combinations thereof (e.g., in an amount of from 5 or 10 percent by weight to 30 or 40 percent by weight).

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. All U.S. Patent documents are to be incorporated by reference herein to the extent consistent with the present specification.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product). The three-dimensional intermediate may also be washed, if desired, before further curing, and/or before, during, or after any intervening forming steps.

"ABPU" or "reactive blocked polyurethane" as used herein refers to UV-curable, (meth)acrylate blocked, polyurethane/polyurea such as described in U.S. Pat. Nos. 9,453,142 and 9,598,606 to Rolland et al. A particular example of a suitable reactive (or UV-curable) blocking agent is a tertiary amine-containing (meth)acrylate (e.g., t-butylaminoethyl methacrylate, t-BAEMA).

Polyisocyanates (including diisocyanates) useful in carrying out the present invention include, but are not limited to, 1,1'-methylenebis(4-isocyanatobenzene) (MDI), 2,4-diisocyanato-1-methylbenzene (TDI), methylene-bis(4-cyclohexylisocyanate) ($H_{12}$MDI), hexamethylene diisocyanate (HDI), isophorone diisocyanate (IPDI), polymeric MDI, 1,4-phenylene diisocyanate (PPDI), and o-tolidine diisocyanate (TODI). In some embodiments, a preferred diisocyanate is $H_{12}$MDI, such as Desmodur W, supplied by Covestro AG. Additional examples include but are not limited to those given in U.S. Pat. No. 3,694,389 to Levy.

"Reactive blocking agents" useful in the present invention are preferably groups that can be removed upon heating and unblock reactive isocyanate groups, and include, but are not limited to, tertiary amine (meth)acrylate monomer blocking agents (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof. See, e.g., US Patent Application Publication No. 20130202392.

"Reactive capping agents" useful in the present invention are generally agents containing one or more groups reactive with polyisocyantes, and one or more groups that are UV polymerizable, including hydroxyl or amine (meth)acrylate monomer capping agents. Examples of suitable capping agents include, but are not limited to, 2-hydroxylethyl acrylate, 2-hydroxylethyl methacrylate, hydroxypropyl acrylate, hydroxypropyl methacrylate, tert-butylaminoethyl methacrylate, 4-hydroxybutyl acrylate, 3-phenoxy 2-hydroxypropyl methacrylate, glycerol methacrylate, etc. Additional examples include, but are not limited to, butane monohydroxy monoacrylate, polypropylene glycol monoacrylate, caprolactone monohydroxy monoacrylate, 2-terbutylaminoethylmethacrylate and 2-terbutylaminoethylacrylate. See EP 0525578 A1 to Peiffer, and U.S. Pat. No. 7,279,505 to Phelan et al., which are incorporated by reference herein.

"Diluents" as used herein includes both UV-curable diluents (for example monoacrylates, mono-methacrylates, polyacrylates, polymethacrylates, acrylamides, methacrylamides, etc.), and non-UV-curable diluents (for example, plasticizers such as bis(2-ethylhexyl) phthalate, bis(2-propylheptyl) phthalate, diisononyl phthalate, tri-(2-ethylhexyl) trimellitate, bis(2-ethylhexyl) adipate, diisononyl adipate, dibutyl sebacate, diisobutyl maleate, etc.).

UV curable polyurethane oligomer products produced through reaction of a polyurethane prepolymer and hydroxyl/amino functionalized (meth)acrylate may contain (meth)acrylate-capped isocyanate molecules due to reaction of free isocyanate molecules in the mixture (unless removed through distillation). Such isocyanate molecules may include, for example, methylene diphenyl diisocyanate (MDI), toluene diisocyanate (TDI), para-phenylene diisocyanate (PPDI), O-tolidine diisocyanate (TODI), 1,5-naphthalene diisocyanate (NDI), hydrogenated MDI (HMDI), isophorone isocyanate (IPDI), hexamethylene diisocyanate (HDI), xylene diisocyanate (XDI) hydrogenated xylene diisocyanate (H6XDI) etc. Particularly when structurally symmetric isocyanate is used such as MDI, PPDI, NDI, HMDI, HDI, H6XDI, the UV monomer capped/blocked isocyanate may have a tendency to crystalize out of the final resin because of the high symmetry in structure leading to easy molecular packing.

For a diisocyanate containing multiple isomers, modifying the isomer ratio to reduce the isomer having high symmetry may inhibit the crystal growth. For example, when HMDI is used, using a mixture having a lower amount of the trans-trans isomer ratio can inhibit crystal growth. In some embodiments, less than 30%, less than 20%, or less than 10% of the total isocyanate is an isomer having high symmetry.

1. Polymerizable Liquids.

Polymerizable liquids (or "resins") useful for additive manufacturing are known and described in, for example, DeSimone et al., U.S. Pat. Nos. 9,211,678; 9,205,601; and 9,216,546. Dual cure additive manufacturing resins containing ABPUs are described in, for example, U.S. Pat. Nos. 9,453,142 and 9,598,606 to Rolland et al., the contents of which are incorporated by reference herein.

A. Light-polymerizable monomers and/or prepolymers. Sometimes also referred to as "Part A" of a dual cure resin, these are monomers and/or prepolymers that can be polymerized by exposure to actinic radiation or light. This resin can comprise difunctional or polyfunctional monomers, but can also include monofunctional monomers (to act as "chain stoppers" to control molecular weight). Examples of reactive end groups suitable for these constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the light polymerizable component, once polymerized, is one which can degrade (e.g., during heating or baking) to form a constituent for further (e.g., heat) cure. Thus, it is converted, in part, to a "Part B" thermally reactive component. In some embodiments, the additional Part B thermally reactive components (e.g., chain extenders such as polyols and/or polyamines) are carried in the green, light cured, object, where they can participate in a subsequent cure to impart desired physical properties to the object.

Chain extenders. Examples of polyol (e.g., diol, triol) chain extenders include, but are not limited to, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, hydroquinone bis(2-hydroxyethyl) ether (HQEE), glycerol, trimethylolpropane, trimethylolpropane ethoxylate (TPE), 1,2,6-hexanetriol, and pentaerythritol. Natural oil polyols (biopolyols) may also be used. Such polyols may be derived, e.g., from vegetable oils (triglycerides), such as soybean oil, by known techniques. See, e.g., U.S. Pat. No. 6,433,121 to Petrovic et al.

Polyamine (e.g., diamine, triamine) chain extenders include, but are not limited to, aliphatic, aromatic, and mixed aliphatic and aromatic, polyamines, such as diamines for example, 4,4'-methylenedicyclohexanamine (PACM), 4,4'-methylenebis(2-methylcyclohexyl-amine) (MACM), ethylene diamine, isophorone diamine, diethyltoluenediamine), and polyetheramines (for example JEFFAMINE® from Huntsman Corporation).

Photoinitiators. Photoinitiators that may be included in the polymerizable liquid (resin) can be any suitable photoinitiator, including type I and type II photoinitiators and including commonly-used UV photoinitiators, examples of which include but are not limited to acetophenones (diethoxyacetophenone for example), phosphine oxides such as diphenyl(2,4,6-trimethylbenzoyl)phosphine oxide, phenylbis(2,4,6-trimethylbenzoyl) phosphine oxide (PPO), Irgacure® 369, etc. See, e.g., U.S. Pat. No. 9,453,142 to Rolland et al.

Crystallization Inhibitors. Additives to the resin formulations useful as inhibitors of crystallization as taught herein include, but are not limited to, small molecule amines, amino alcohols, ureas, salts, and polymers.

Amine crystallization inhibitors include those of the general Formulas A-D below:

wherein R, R1, and R2 are each independently an aliphatic or aromatic group. Examples of amine additives include, but are not limited to, diisopropanolamine, 2-(methylamino) ethanol, diethanolamine, 2-(ethylamino)ethanol, 3-(methylamino)propane-1,2-diol, tris(hydroxymethyl)aminomethane, 2-amino-2-ethyl-1,3-propanediol, Clear link 1000, Jefflink™ 754 diamine, Desmophen® NH 1420 (Covestro), 1,3-bis(methylamino)propan-2-ol, Jeffamine® D-230 polyether amine (Huntsman Corporation), etc.

Amino alcohol crystallization inhibitors include, but are not limited to, N-methyldiethanolamine, N-ethyldiethanolamine, 3-(dimethylamino)-1,2-propanediol, N-phenyldiethanolamine, 3-(bis(2-hydroxyethyl)amino)propan-1-ol, N-butyldiethanolamine, etc.

Urea crystallization inhibitors include, but are not limited to, N,N-dimethylurea, 1,3-diethylurea, 1,1-diethylurea, N,N-bis(hydroxymethyl)urea, N-methylurea, etc.

Examples of salts useful as crystallization inhibitors include, but are not limited to, sodium 2-ethylhexanoate, sodium hexanoate, sodium dodecanoate, lithium octanoate, etc.

Examples of polymers useful as crystallization inhibitors include, but are not limited to, PVP (polyvinylpyrrolidone), polyvinylpyrrolidone-vinyl acetate copolymer (PVPVA), hydroxypropyl methylcellulose (HPMC), hypromellose acetate succinate (HPMCAS), polyacrylic acid (PAA), etc.

In some embodiments, the crystallization inhibitors are included in the resin composition in an amount of from 0.05 or 0.1 to 1, 3 or 5% by weight, such as 0.1 to 1% by weight, of the total composition.

Additional Additives. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semiconductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/non-reactive light absorbers. In some embodiments, polymerizable liquids for carrying out the present invention may include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Organic diluents. Diluents for use in resin compositions may be non-reactive or reactive. In some embodiments, diluents are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, isobornyl methacrylate, TBAEMA (tert-butyl amino ethyl methacrylate), tetrahydrofurfuryl methacrylate, N,N-dimethylacrylamide, N-vinyl-2-pyrrolidone, and N-vinyl formamide, or a mixture of two or more thereof. The diluent may be included in the polymerizable liquid in any suitable amount, typically from 1, 5 or 10 percent by weight, up to about 30 or 40 percent by weight, or more.

2. Methods.

Suitable additive manufacturing methods and apparatus in which resins as described herein can be used include bottom-up and top-down additive manufacturing apparatus, as known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, US Patent Application Pub. No. US 2017/0129167. B. Feller, US Pat App. Pub. No. US 2018/0243976 (Aug. 30, 2018); M. Panzer and J. Tumbleston, US Pat App Pub. No. US 2018/0126630 (May 10, 2018); and K. Willis and B. Adzima, US Pat App Pub. No. US 2018/0290374 (Oct. 11, 2018).

Following additive manufacturing, objects can, if desired, be cleaned (e.g., wiped, washed, spun to centrifugally separate unpolymerized resin from the object, etc.) and further cured (e.g., by baking), in accordance with known techniques.

Embodiments of the present invention are explained in greater detail in the following non-limiting examples.

EXAMPLES

Example 1

Use of Crystallization Inhibitors

The additives listed below were mixed with elastomeric polyurethane resin EPU 44 using overhead mixing or centrifugal mixing equipment (THINKY® or Flacktek). EPU 44 is similar to EPU 41, which is commercially available from Carbon, Inc., Redwood City, Calif., except that the soft segment of the polyurethane prepolymer is bio-based and different diluents are used. For amine additives, the mixture was incubated at 50° C. overnight afterwards. For other additives, no additional treatment was performed. The samples were then transferred into scintillation vials or Nalgene bottles and kept under different conditions to monitor crystal growth.

I. Amine: Diisopropanolamine, 2-(Methylamino)ethanol, Diethanolamine, 2-(Ethylamino)ethanol, 3-(Methylamino)propane-1,2-diol, Tris(hydroxymethyl)aminomethane, 2-amino-2-ethyl-1,3-propanediol, Clear link 1000, Jefflink 754, Desmophen NH1420, 1,3-bis(methylamino)propan-2-ol, Jeffamine D230
  II. Amino alcohol: N-Methyldiethanolamine, N-Ethyldiethanolamine, 3-(Dimethylamino)-1,2-propanediol, N-Phenyldiethanolamine, 3-(Bis(2-hydroxyethyl)amino)propan-1-ol, N-Butyldiethanolamine, etc.
  III. Urea: N,N'-Dimethylurea, 1,3-Diethylurea, 1,1-Diethylurea, N,N'-Bis(hydroxymethyl)urea, N-Methylurea, etc.
  IV. Salt: Sodium 2-ethylhexanoate, Sodium hexanoate, Sodium dodecanoate, Lithium octanoate, etc.
  V. Polymer: PVP (polyvinylpyrrolidone)

Results are indicated in Table 1. It was found that by addition of a low percentage of certain additives (0.1 to 1%) into polyurethane oligomer resins, the crystal formation can be inhibited. Small molecules including amino alcohols, amines, ureas, salts, and the polymer PVP were found to work efficiently to inhibit the crystal growth when about 0.1 to about 5% of them were used.

TABLE 1

Inhibition of Crystal Formation in EPU with additives

| Inhibition of crystal formation (better with more +) | Additives |
| --- | --- |
| + + + | Diisopropanolamine |
| | 3-(Methylamino)propane-1,2-diol |
| | Clear link 1000 |
| | Jefflink ™ 754 diamine |
| + + | 2-(Methylamino)ethanol |
| | Diethanolamine |
| | 2-(Ethylamino)ethanol |
| | Tris(hydroxymethyl)aminomethane |
| | Desmophen ® NH 1420 |
| | 1,3-bis(methylamino)propan-2-ol |
| | Jeffamine ® D-230 polyether amine |
| | N,N'-Dimethylurea |
| | 1,3-Diethylurea |
| | 1,1-Diethylurea |
| | N,N'-Bis(hydroxymethyl)urea |
| | N-Methylurea |
| | PVP |
| + | 1,1-Diethylurea |
| | Sodium 2-ethylhexanoate |
| | Sodium hexanoate |
| | Sodium dodecanoate |
| | Lithium octanoate |

Figure 1:
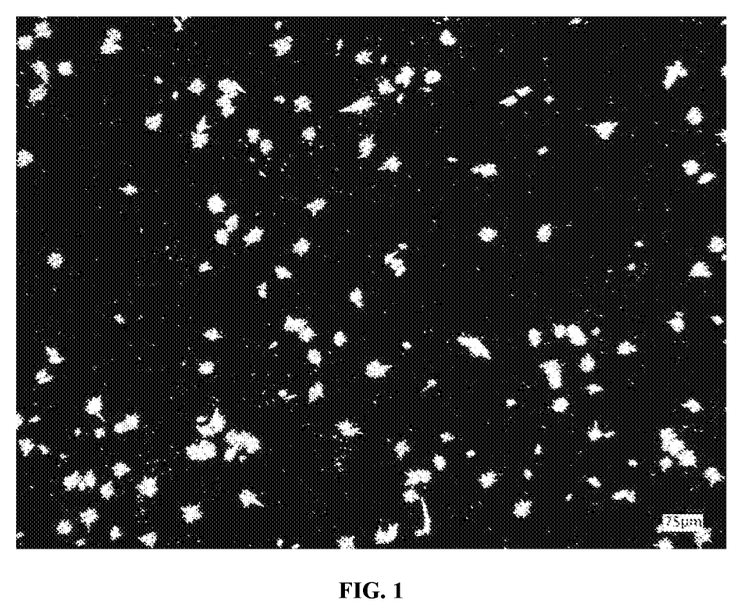
FIG. 1. Polarized light microscopic image of a resin containing UV curable polyurethane oligomer without additives, after being stored at room temperature for 19 days.
Figure 2:
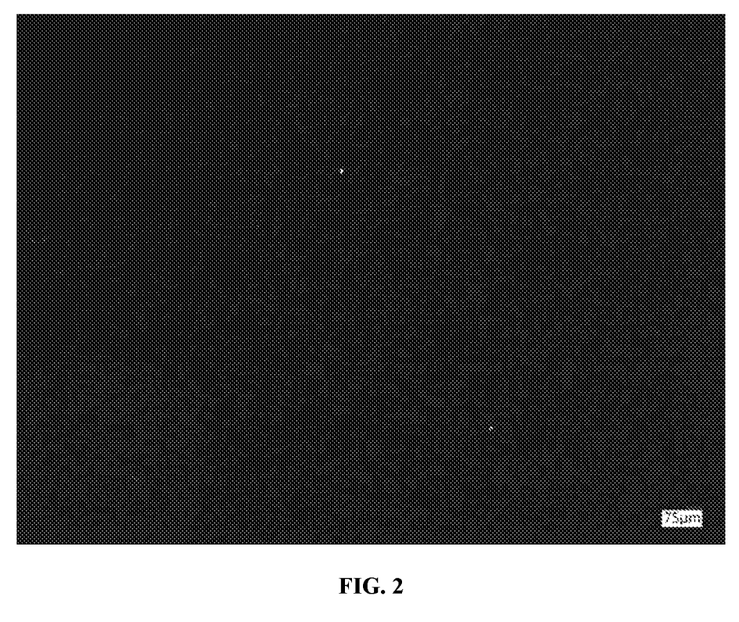
FIG. 2. Polarized light microscopic image of the same resin as in FIG. 1 added with additive 3-(methylamino) propane-1,2-diol, after being stored at room temperature for 19 days.

FIG. 1 is a polarized light microscopic image of a resin containing UV curable polyurethane oligomer (based on reaction product of tert-butylaminoethyl methacrylate and HMDI based polyurethane prepolymer). The resin was stored at room temperature for 19 days, and there were already many crystals forming. When the additives were being used for the same storage time and condition, there were very few crystals observed. FIG. 2 shows the same resin after storage when added with one of the additives, 3-(methylamino)propane-1,2-diol.

Other polyurethane resins such as EPU 41 can likewise be modified to include one or more of these additives.

Example 2

Isomer Ratio

For a diisocyanate having multiple isomers, choosing a product having an isomer ratio that affects the crystal packing can inhibit crystal growth. In the case of HMDI, the trans-trans isomer is the one mostly likely to crystalize due to its higher structural symmetry. We found that using Wanhua's H1210 product that contains HMDI with the least overall % of the trans-trans isomer inhibited crystal growth compared to when other HMDI products were used in which there is more of the trans-trans isomer.

Figure 3:
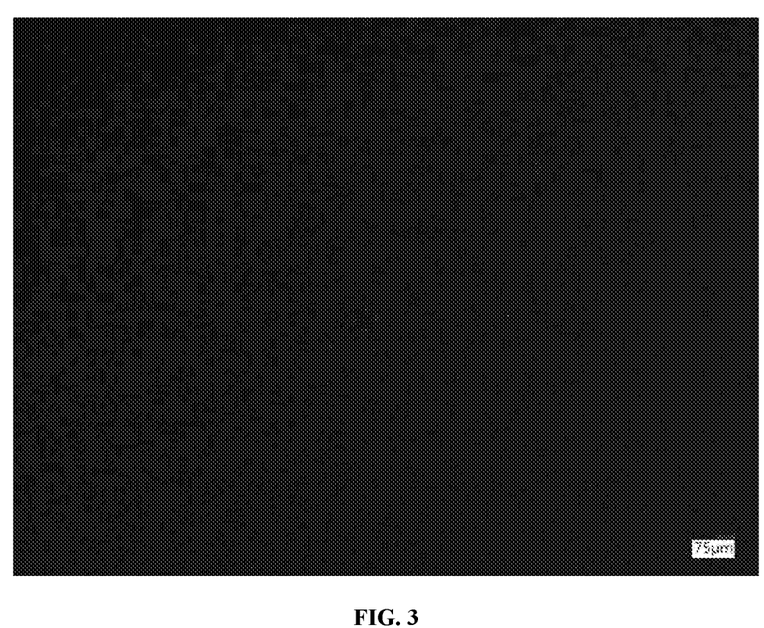
FIG. 3. Polarized light microscopic image of the same formulation as in FIG. 1 but with Wanhua H1210 used in the prepolymer, after being stored at room temperature for 19 days.

FIG. 3 shows a crystal-free image of the same formulation as in FIG. 1 but synthesized with Wanhua H1210.

The foregoing is illustrative of the present invention, and is not to be construed as limiting thereof. The invention is defined by the following claims, with equivalents of the claims to be included therein.

We claim:

1. A resin composition useful for additive manufacturing, comprising:
  (i) a reactive prepolymer, said prepolymer comprising a polyurethane, polyurea, or copolymer thereof, and terminated with a reactive group, said reactive group polymerizable by actinic radiation or light;
  (ii) a reactive monomer, wherein said monomer is produced by reaction of an isocyanate with a reactive capping agent or a reactive blocking agent;
  (iii) a crystallization inhibitor;
  (iv) optionally, a photoinitiator;
  (v) optionally, a reactive or non-reactive diluent; and
  (vi) optionally, an ultraviolet light absorber and/or pigment.

2. The resin composition of claim 1, wherein said group polymerizable by actinic radiation or light is an acrylate, methacrylate, maleimide, or n-vinyl formamide.

3. The resin composition of claim 1, wherein said reactive prepolymer is produced by reaction of a polyisocyanate oligomer with an amine (meth)acrylate or hydroxyl (meth)acrylate capping agent or blocking agent.

4. The resin composition of claim 1, wherein said crystallization inhibitor comprises a small molecule amine, amino alcohol, urea, or salt.

5. The resin composition of claim 1, wherein said crystallization inhibitor comprises a polymer such as polyvinylpyrrolidone (PVP), polyvinylpyrrolidone-vinyl acetate copolymer (PVPVA), hydroxypropyl methylcellulose (HPMC), hypromellose acetate succinate (HPMCAS), polyacrylic acid (PAA), or a mixture of two or more thereof.

6. The resin composition of claim 1, wherein said reactive monomer is produced by reaction of an isocyanate selected from the group consisting of: methylene diphenyl diisocyanate (MDI), toluene diisocyanate (TDI), para-phenylene diisocyanate (PPDI), O-tolidine diisocyanate (TODI), 1,5-naphthalene diisocyanate (NDI), hydrogenated MDI (HMDI), isophorone isocyanate (IPDI), hexamethylene diisocyanate (HDI), xylene diisocyanate (XDI), and hydrogenated xylene diisocyanate (H6XDI).

7. The resin composition of claim 1, wherein said reactive monomer is produced by reaction of an isocyanate selected from the group consisting of: MDI, PPDI, NDI, HMDI, HDI, and H6XDI.

8. A method of forming a three-dimensional object comprising polyurethane, polyurea, or a copolymer thereof, comprising:
  (a) providing the resin composition of claim 1; and (b) forming the three-dimensional object by an additive manufacturing process including irradiating said resin composition with light to polymerize the reactive prepolymer and form said three-dimensional object comprising polyurethane, polyurea, or a copolymer thereof.

9. The method of claim 8, wherein said forming step (b) is carried out by stereolithography.

10. The method of claim 8, wherein said forming step (b) is carried out by: (i) providing a carrier and an optically transparent member having a build surface, said carrier and said build surface defining a build region therebetween; (ii) filling said build region with said resin composition, and (iii) irradiating said build region with light through said optically transparent member to polymerize said resin composition and also advancing said carrier and said build surface away from one another to form said three-dimensional object.

11. A dual cure additive manufacturing resin, comprising:
(a) light polymerizable component comprised of:
 (i) a prepolymer comprising a blocked or reactive blocked polyurethane, polyurea, or copolymer thereof;
 (ii) a reactive monomer, wherein said monomer is produced by reaction of an isocyanate with a reactive capping agent or a blocking agent;
 (iii) a crystallization inhibitor;
 (iv) optionally, a photoinitiator;
 (v) optionally, a reactive or non-reactive diluent; and
 (vi) optionally, an ultraviolet light absorber and/or pigment; and
(b) a heat polymerizable component comprised of a chain extender selected from the group consisting of polyols, polyamines, and combinations thereof.

12. The resin of claim 11, wherein said prepolymer comprises a (meth)acrylate blocked polyurethane/polyurea (ABPU).

13. The resin of claim 11, wherein said prepolymer comprises a reactive blocked prepolymer produced by reaction of a polyisocyanate oligomer with an amine (meth)acrylate or a hydroxyl (meth)acrylate blocking agent.

14. The resin of claim 11, wherein said crystallization inhibitor comprises a small molecule amine, amino alcohol, urea, or salt.

15. The resin of claim 11, wherein said crystallization inhibitor comprises a polymer such as polyvinylpyrrolidone (PVP), polyvinylpyrrolidone-vinyl acetate copolymer (PVPVA), hydroxypropyl methylcellulose (HPMC), hypromellose acetate succinate (HPMCAS), polyacrylic acid (PAA), or a mixture of two or more thereof.

16. The resin of claim 11, wherein said reactive monomer is produced by reaction of an isocyanate selected from the group consisting of: methylene diphenyl diisocyanate (MDI), toluene diisocyanate (TDI), para-phenylene diisocyanate (PPDI), O-tolidine diisocyanate (HTODI), 1,5-naphthalene diisocyanate (NDI), hydrogenated MDI (HMDI), isophorone isocyanate (IPDI), hexamethylene diisocyanate (HDI), xylene diisocyanate (XDI) hydrogenated xylene diisocyanate (H6XDI).

17. The resin of claim 11, wherein said reactive monomer is produced by reaction of an isocyanate selected from the group consisting of: MDI, PPDI, NDI, HMDI, HDI, and H6XDI.

18. A method of forming a three-dimensional object comprising polyurethane, polyurea, or a copolymer thereof, comprising:
(a) providing the dual cure resin of claim 11;
(b) producing a three-dimensional intermediate from said dual cure resin by an additive manufacturing process including irradiating said resin with light to form a solid polymer scaffold from said light polymerizable component and containing said heat polymerizable component carried in said scaffold in unsolidified and/or uncured form, said intermediate having the same shape as, or a shape to be imparted to, said three-dimensional object;
(c) optionally cleaning said intermediate; and
(d) concurrently with or subsequent to said producing step (b), heating, microwave irradiating, or both, said heat polymerizable component in said three-dimensional intermediate, to form said three-dimensional object comprising polyurethane, polyurea, or a copolymer thereof.

19. The method of claim 18, wherein said producing step (b) is carried out by stereolithography.

20. The method of claim 18, wherein said producing step (b) is carried out by: (i) providing a carrier and an optically transparent member having a build surface, said carrier and said build surface defining a build region therebetween; (ii) filling said build region with said resin, and (iii) irradiating said build region with light through said optically transparent member to form said solid polymer scaffold from said light polymerizable component and also advancing said carrier and said build surface away from one another to form said three-dimensional intermediate.

21. The method of claim 18, wherein said step (d) is carried out subsequent to said producing step (b).

22. A three-dimensional object produced by a method of claim 8.

23. A resin composition useful for additive manufacturing, comprising:
(i) a reactive prepolymer, said prepolymer comprising a polyurethane, polyurea, or copolymer thereof, and terminated with a reactive group, said reactive group curable by actinic radiation or light;
(ii) a reactive monomer, wherein said monomer is produced by reaction of an isocyanate with a reactive capping agent or a blocking agent;
(iii) optionally, a crystallization inhibitor;
(iv) optionally, a photoinitiator;
(v) optionally, a reactive or non-reactive diluent; and
(vi) optionally, an ultraviolet light absorber and/or pigment,
wherein said reactive monomer is produced by reaction of an isocyanate, wherein said isocyanate comprises multiple isomers and wherein the isocyanate comprises a lower percentage of the structurally symmetric isomer.

24. A method of forming a three-dimensional object comprising polyurethane, polyurea, or a copolymer thereof, comprising:
(a) providing the resin composition of claim 23; and
(b) forming the three-dimensional object by an additive manufacturing process including irradiating said resin composition with light to polymerize the reactive prepolymer and form said three-dimensional object comprising polyurethane, polyurea, or a copolymer thereof, optionally wherein said forming step (b) is carried out by stereolithography.

25. A dual cure additive manufacturing resin, comprising:
(a) light polymerizable component comprised of:
 (i) a prepolymer comprising a blocked or reactive blocked polyurethane, polyurea, or copolymer thereof;
 (ii) a reactive monomer, wherein said monomer is produced by reaction of an isocyanate with a reactive capping agent or a blocking agent;

(iii) optionally, a crystallization inhibitor;
(iv) optionally, a photoinitiator;
(v) optionally, a reactive or non-reactive diluent; and
(vi) optionally, an ultraviolet light absorber and/or pigment, wherein said prepolymer is produced by reaction of an isocyanate, wherein said isocyanate comprises multiple isomers and wherein the isocyanate comprises a lower percentage of the structurally symmetric isomer; and (b) a heat polymerizable component comprised of a chain extender selected from the group consisting of polyols, polyamines, and combinations thereof.

26. A method of forming a three-dimensional object comprising polyurethane, polyurea, or a copolymer thereof, comprising:
(a) providing the dual cure resin of claim 25;
(b) producing a three-dimensional intermediate from said dual cure resin by an additive manufacturing process including irradiating said resin with light to form a solid polymer scaffold from said light polymerizable component and containing said heat polymerizable component carried in said scaffold in unsolidified and/or uncured form, said intermediate having the same shape as, or a shape to be imparted to, said three-dimensional object;
(c) optionally cleaning said intermediate; and
(d) concurrently with or subsequent to said producing step (b), heating, microwave irradiating, or both, said heat polymerizable component in said three-dimensional intermediate, to form said three-dimensional object comprising polyurethane, polyurea, or a copolymer thereof, optionally wherein said producing step (b) is carried out by stereolithography.

27. A three-dimensional object produced by a method of claim 24.

* * * * *